United States Patent

[11] 3,602,198

| [72] | Inventors | Robert B. Tackett<br>Rte 4;<br>Henry O. Markley, Box 235, both of<br>Warrensburg, Mo. 64093 |
|---|---|---|
| [21] | Appl. No. | 794,095 |
| [22] | Filed | Jan. 27, 1969 |
| [45] | Patented | Aug. 31, 1971 |

[54] POULTRY LOADING APPARATUS
3 Claims, 13 Drawing Figs.

[52] U.S. Cl. .................................................. 119/82, 98/114
[51] Int. Cl. .................................................. A01k 29/00
[50] Field of Search ........................................ 119/82; 198/114, 165; 214/512; 296/24

[56] References Cited
UNITED STATES PATENTS

| 2,687,113 | 8/1954 | Gault | 119/22 |
|---|---|---|---|
| 2,840,041 | 6/1958 | Fleming | 119/82 |
| 2,843,086 | 6/1958 | Graham | 119/22 |
| 3,103,915 | 9/1963 | Crain et al. | 119/82 |
| 3,389,780 | 6/1968 | Jerome | 198/165 |
| 3,420,211 | 1/1969 | Hartvickson | 119/82 |
| 3,476,089 | 11/1969 | Jerome | 119/82 |

Primary Examiner—Aldrich F. Medbery
Attorney—Fishburn, Gold and Litman

ABSTRACT: A poultry loading apparatus has an inclined conveyor having an upper end pivotally mounted at one end of a horizontal conveyor which is raised and lowered by power operated scissor linkages to position the horizontal conveyor at an elevation corresponding to cages being loaded with poultry. Belts on the inclined conveyor and on the horizontal conveyor are driven to move poultry up the inclined conveyor onto the horizontal conveyor and therealong where the poultry is manually removed and placed in the cages. The loading apparatus has operation control and cooperative mechanism to prevent excessive quantities of poultry being delivered to the unloading station of the structure. The poultry loading apparatus is mounted on a mobile frame and has a poultry retaining structure above the belt on the inclined conveyor and above the belt on the horizontal conveyor.

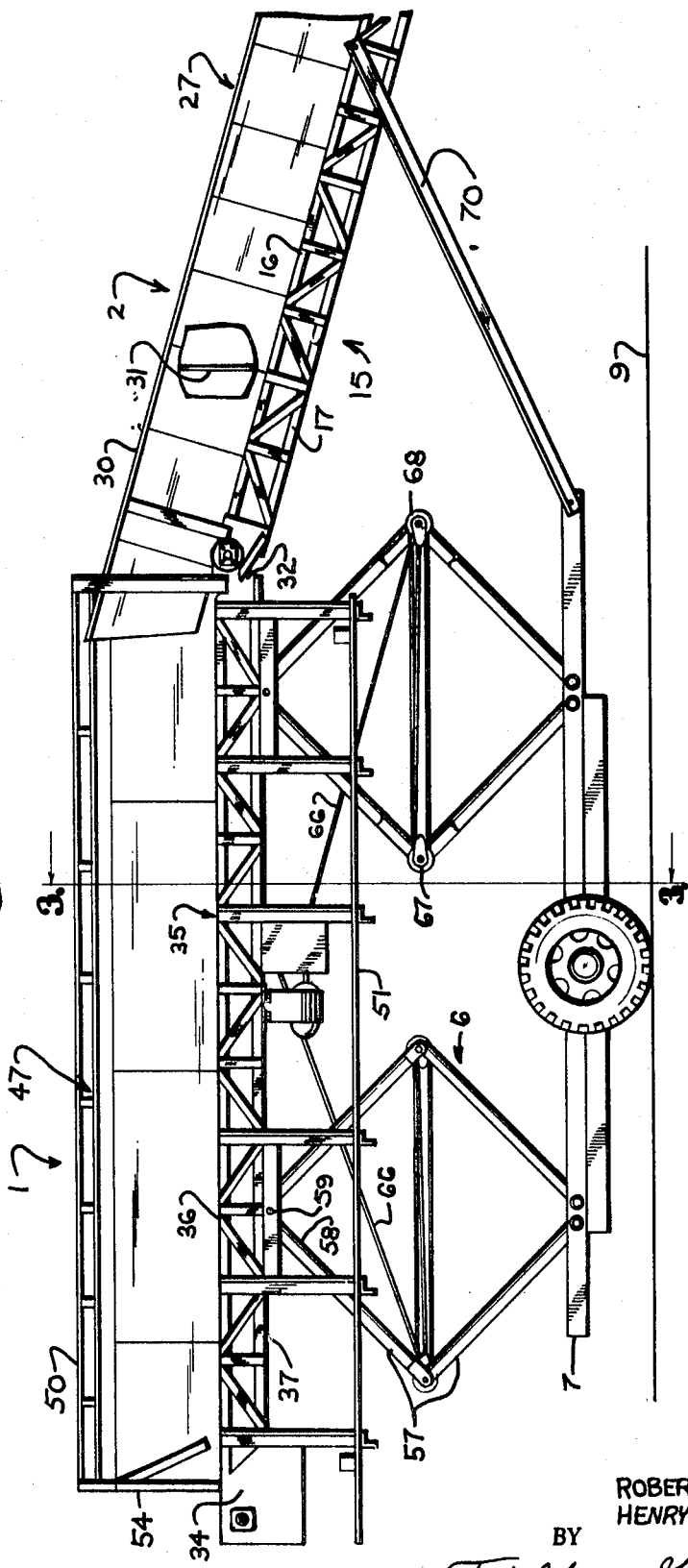

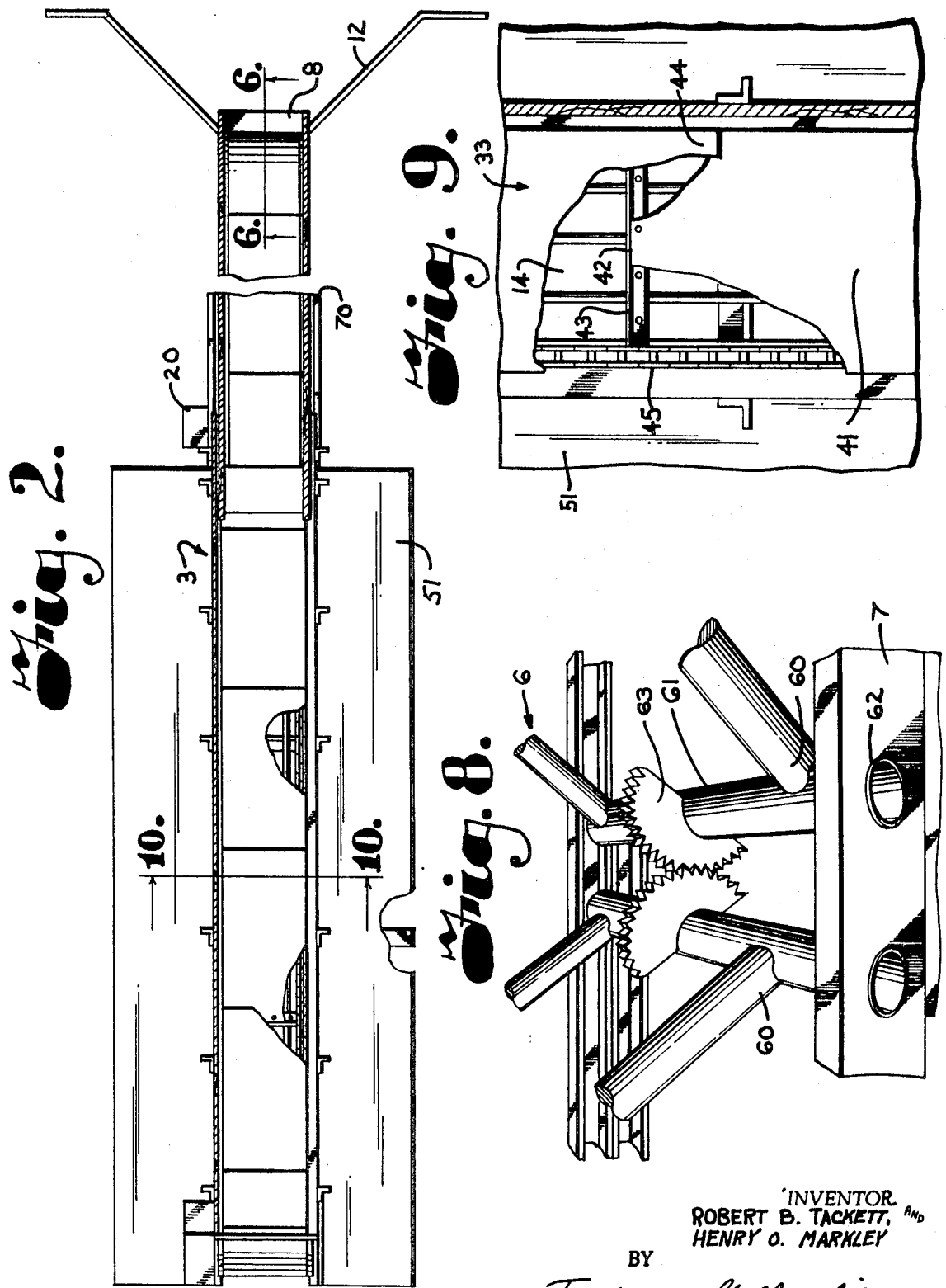

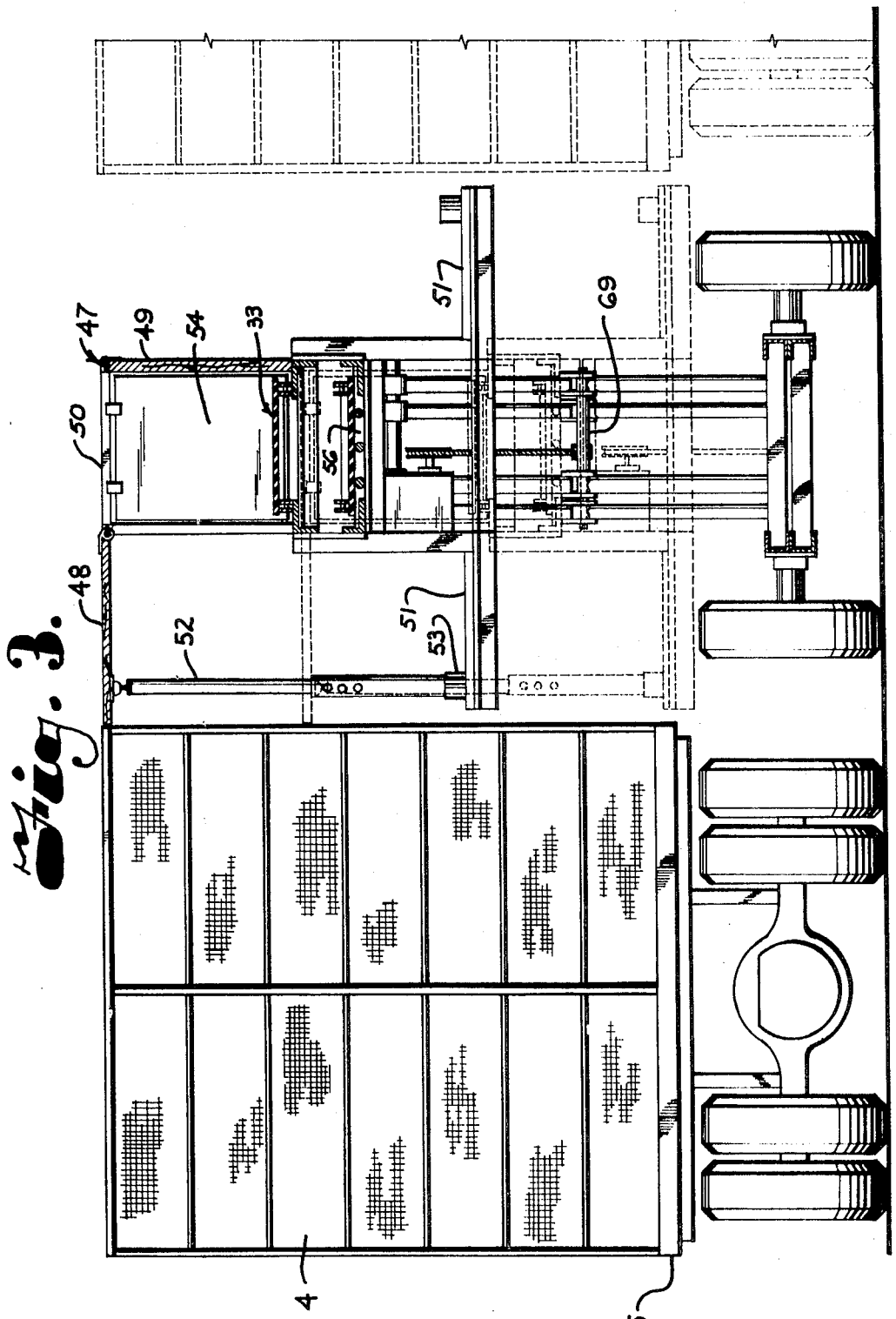

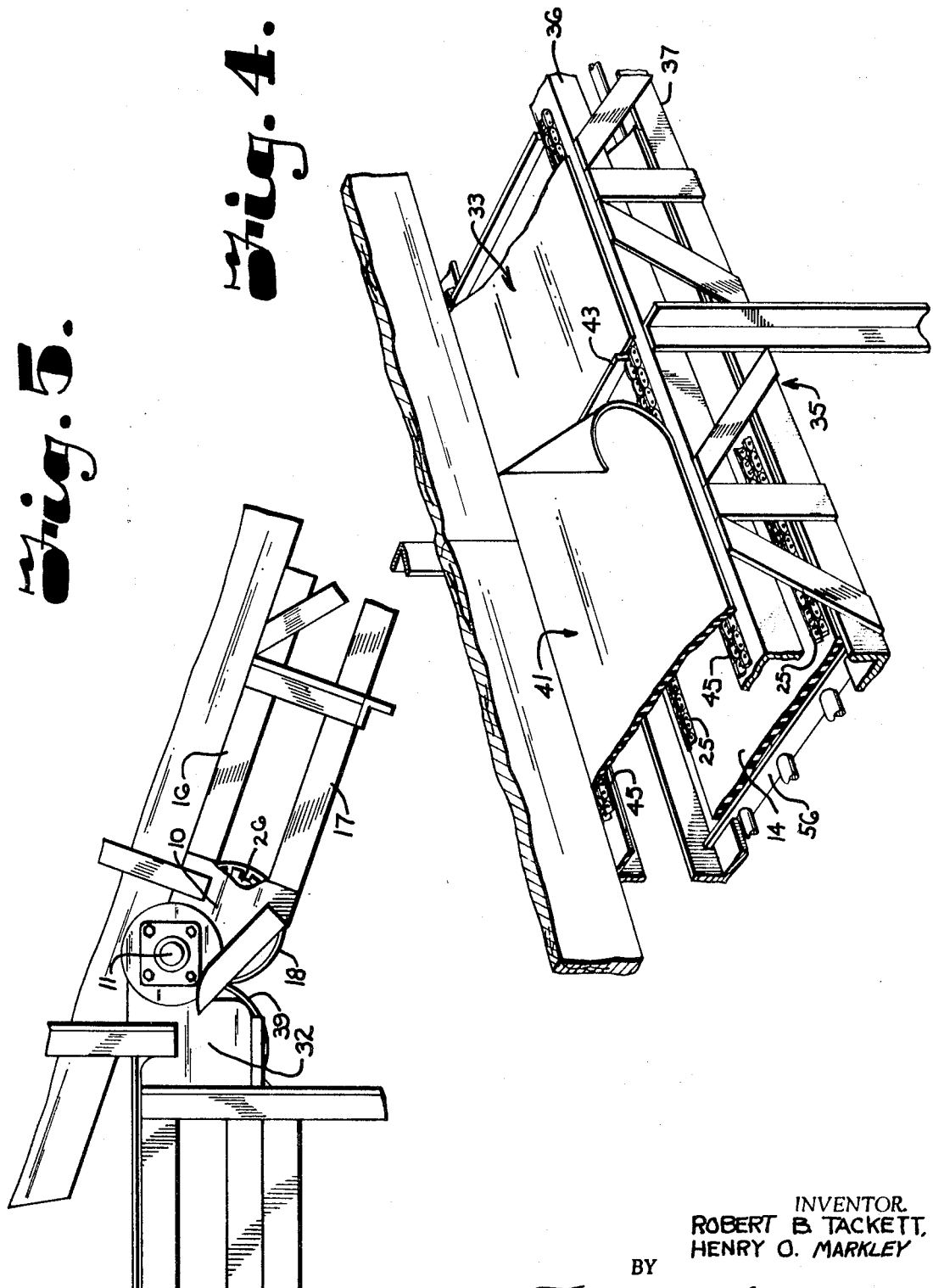

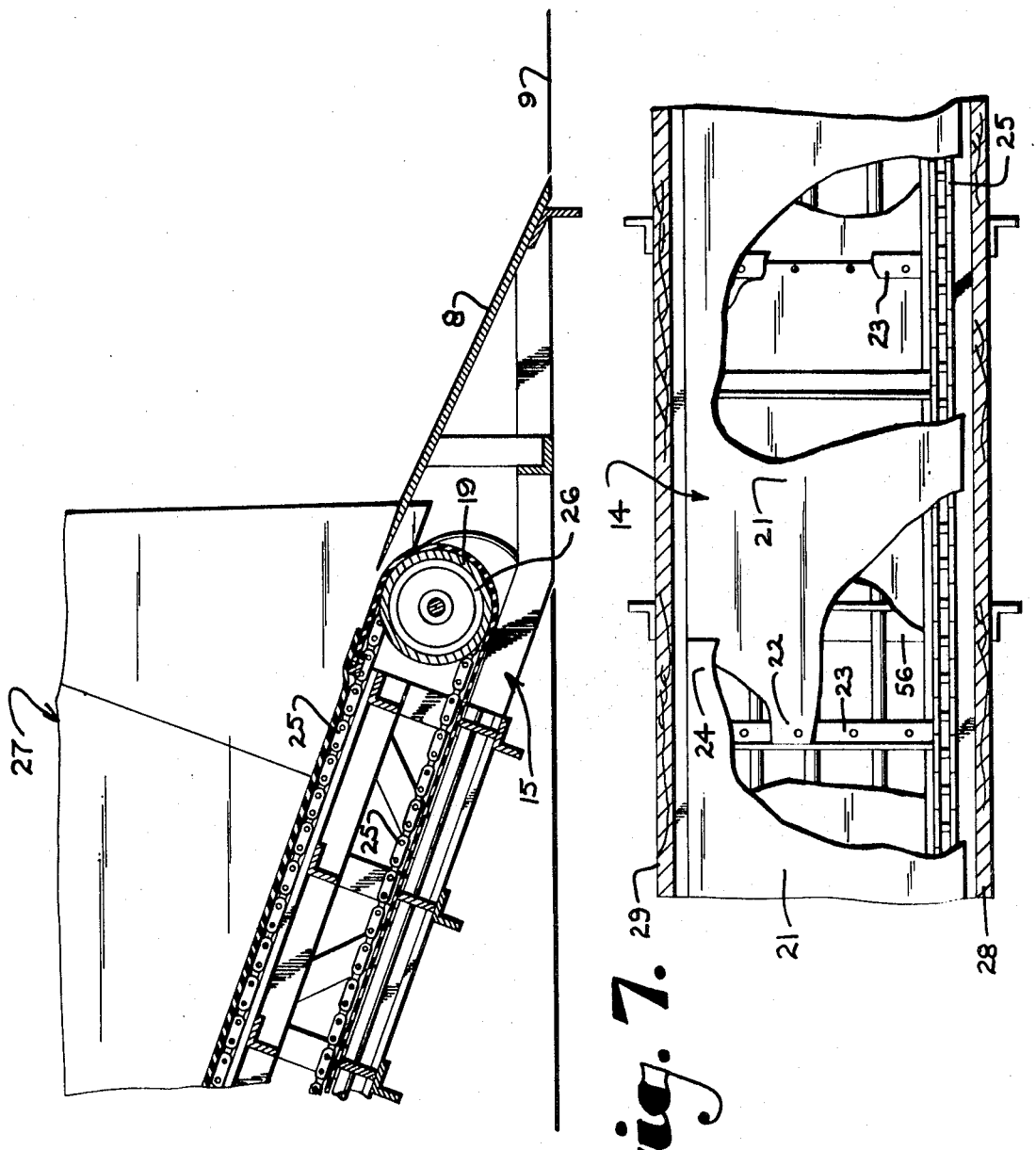

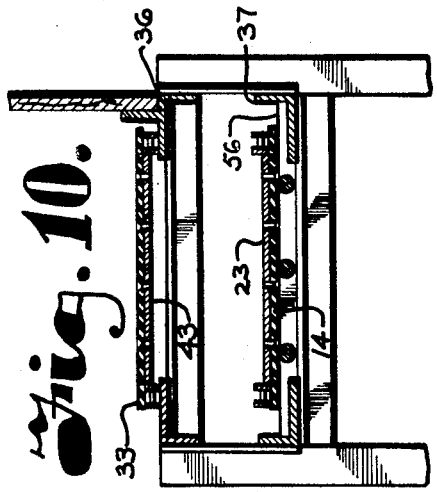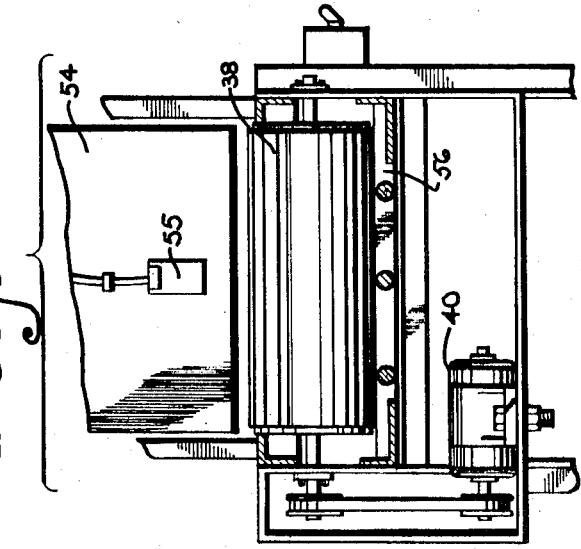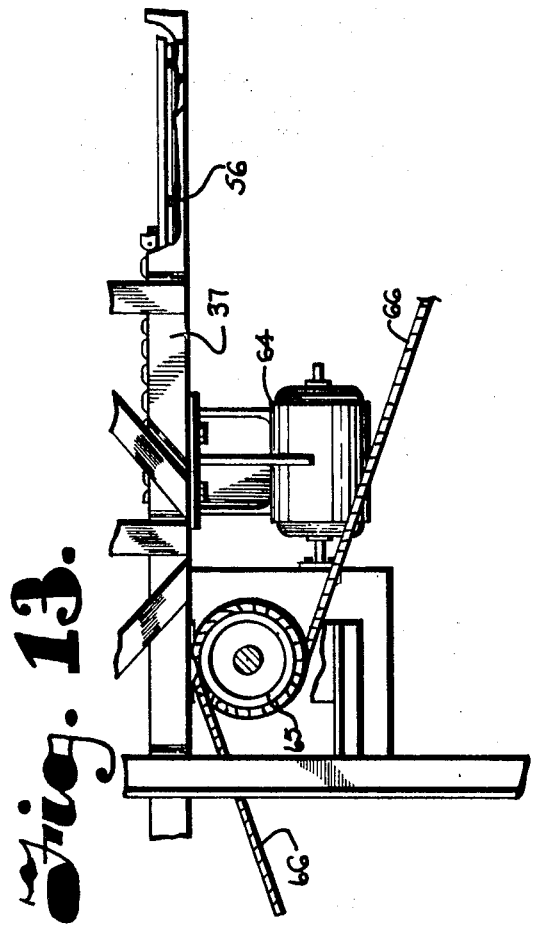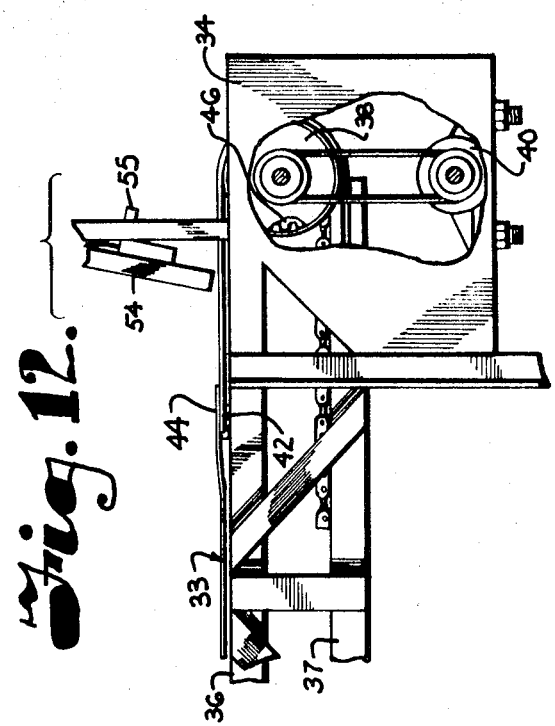

POULTRY LOADING APPARATUS

The present invention relates to the poultry loading apparatus and more particularly to such poultry loading apparatus having an inclined conveyor having one end pivotally mounted on a horizontal conveyor which may be raised and lowered relative to cages on vehicles for receiving and transporting poultry.

Poultry are driven from an area of confinement, such as a brooder house onto poultry loading apparatus having an inclined conveyor which moves the poultry upwardly and onto a horizontal loading conveyor from which they are manually removed and placed in cages on a suitable poultry transporting vehicle, such as a truck or trailer. Movement of the conveyors and blocking of light above the poultry tends to keep the poultry frozen in position whereby they may be easily grasped and moved into the cages.

The poultry transporting vehicle preferably has a plurality of cages positioned in rows on each side thereof with the rows stacked vertically whereby the horizontal loading conveyor is elevated to a level corresponding with the level of the row of cages being loaded or at a suitable level for convenient movement of poultry from the loading conveyor to receiving cages, thereby providing substantially continuous loading of the rows of cages on one side of the vehicle.

A platform is positioned or may be positioned adjacent opposite sides of the horizontal loading conveyor whereby operators or loaders may load poultry from either side thereof. When the cages on one side of the transporting vehicle are filled, the vehicle is moved to the other side of the horizontal conveyor or reversed in position and the cages on the other side of the vehicle are filled.

The poultry loading apparatus is particularly adapted for movement to poultry houses and is easily positioned adjacent a loading opening of the houses by being mounted on a mobile frame.

The principal objects of the present invention are: to provide poultry loading apparatus for moving poultry from an area of confinement, such as a house or the like, to cages on a truck or other transporting vehicle; to provide such poultry loading apparatus having a horizontal loading conveyor from which poultry is manually removed and placed in cages or like compartments; to provide such poultry loading apparatus wherein the horizontal conveyor is adjustable to a level approximately corresponding with the level of a row of cages being loaded; to provide such poultry loading apparatus which is adapted to move and load an increased volume of poultry with a minimum of manual handling of the poultry; to provide such poultry loading apparatus which is adapted to simplify the operation and substantially increase the efficiency, convenience and speed of loading poultry; and to provide such poultry loading apparatus which is economical to manufacture and operate, easily maintained, positive in operation and particularly adapted to efficiently load poultry.

Other objects and advantages of this invention will become apparent from the following description taken in connection with the accompanying drawings wherein are set forth by way of illustration and example certain embodiments of this invention.

FIG. 1 is an elevational view of poultry loading apparatus embodying features of the present invention.

FIG. 2 is a plan view of the poultry loading apparatus.

FIG. 3 is a transverse sectional view through the poultry loading apparatus taken on line 3—3, FIG. 1 showing positions thereof relative to rows of cages on a poultry transporting vehicle.

FIG. 4 is an enlarged partial perspective of a horizontal poultry loading conveyor.

FIG. 5 is an enlarged partial elevational view of the pivotal connection of an inclined poultry moving conveyor with the horizontal loading conveyor.

FIG. 6 is a fragmentary sectional view through a lower end of the inclined conveyor taken on line 6—6 FIG. 2.

FIG. 7 is an enlarged partial plan view of the inclined conveyor.

FIG. 8 is an enlarged perspective view of interengaging gears of scissor linkages for raising and lowering the horizontal conveyor.

FIG. 9 is an enlarged partial plan view of the horizontal conveyor.

FIG. 10 is a partial transverse sectional view through the horizontal conveyor taken on line 10—10 of FIG. 2.

FIG. 11 is a fragmentary end elevational view of the horizontal conveyor with portions broken away to better illustrate the component parts.

FIG. 12 is a fragmentary side elevational view of the horizontal conveyor showing drive means therefor.

FIG. 13 is a fragmentary elevational view of drive means for raising and lowering the horizontal conveyor.

Referring more in detail to the drawings:

The reference numeral 1 generally designates poultry loading apparatus having an inclined poultry moving conveyor 2 for receiving poultry driven from an area of confinement, such as a poultry house or the like, and moving the poultry onto a horizontal loading conveyor 3. Loaders or operators (not shown) are adjacent to the horizontal conveyor 3 and manually move the poultry from the horizontal conveyor 3 into one of a plurality of cages 4 arranged in longitudinal vertically stacked rows on a suitable transporting vehicle, such as a truck or trailer 5. The horizontal loading conveyor 3 is adjusted in elevation by elevating means, such as opposed scissor linkages 6 to correspond to each elevation or level of the rows of cages 4 being loaded. The poultry loading apparatus 1 is mounted on a mobile frame 7 whereby same may be moved from poultry house to poultry house with structure to assist in maintaining the horizontal conveyor 3 in a level relation, as later described.

The inclined conveyor 2 is an elongate structure having a lower end 8 adapted to engage a ground surface 9 within or adjacent the area of confinement for poultry, such as the poultry house, and an upper end 10 pivotally mounted relative to the horizontal conveyors 3, as by an elongate pin or pins 11 or other suitable hinge means. The lower end 8 of the inclined conveyor 2 is substantially fixed in position and a suitable poultry guide structure, such as gates or doors 12 of the poultry house, is positioned to engage the lower end 8, as later described.

A belt 14 is movably mounted on the inclined conveyor 2 and travels in an endless path around the lower end 8 and the upper end 10 as later described. The inclined conveyor 2 includes a frame 15 formed by a pair of laterally spaced trusses each having an upper chord 16 and a lower chord 17. The path of the belt 14 is along an upper run defined by the upper chords 16 to an upper roller 18 and therearound in a semicircular path and along a lower run defined by the lower chords 17 to a lower roller 19 and therearound in a semicircular path to return to travel along the upper run. The belt 14 is driven along the endless path by suitable drive means, such as a motor 20, which is operatively connected with one of the rollers, such as the upper roller 18.

In the illustrated structure, the belt 14 is formed of a plurality of elongate belt sections 21 each having a leading end 22 mounted on one of a plurality of longitudinally spaced elongate belt support members 23 and a free or trailing end 24 positioned in an overlying relation with a leading end 22 of a trailing belt section 21 with the belt support member 23 also supporting the leading end 22 of the trailing belt section 21. The elongate belt support members 23 each extend transversely between a pair of laterally spaced endless power transmitting members in the form of chains 25 and are spaced apart a distance so that the belt sections between the support members 23 sag downwardly from the weight of a poultry to form a pocket which cradles the poultry and acts to keep it immobile in transit, The upper or driving roller 18 and the lower or direction changing roller 19 each are illustrated as having a pair of sprockets 26 each having a plurality of circumferentially spaced teeth engaging within links of the respective chains 25 to move same in the endless path along the inclined conveyor 2.

It has been found that poultry, such as turkeys, tend to remain more or less immobile or frozen in place while they are being moved on a conveyor; however, if they see light above them, they may fly upwardly toward the light. Turkeys also tend to squat while being moved on a conveyor to increase their stability.

Suitable poultry retaining means, such as a housing 27, is mounted on the inclined conveyor 2 and positioned above the belt 14. The housing 27 has a pair of laterally spaced sidewalls 28 and 29 spaced adjacent opposite side edges of the belt sections 21. An upper or top wall 30 extends between opposite upper edges of the sidewalls 28 and 29 with the top wall 30 being spaced above the belt 14 and substantially parallel with the inclined conveyor 2 at a distance above the belt 14 sufficient to permit the poultry to move therebetween. A plurality of longitudinally spaced flexible curtains 31 are mounted on the top wall 3 and depend therefrom to cooperate with the sidewalls and top wall to block light from view of the poultry on the inclined conveyor 2.

The horizontal conveyor 3 is an elongate structure having one end 32 adjacent the upper end 10 of the inclined conveyor 2 and a belt 33 mounted thereon which travels in an endless path around the one end 32 and the other end 34. The horizontal conveyor 3 includes a frame 35 formed by a pair of laterally spaced trusses each having an upper chord 36 and a lower chord 37. The path of the belt 33 is along an upper run defined by the upper chords 36 to a roller 38 at the other end 34 and around the roller 38 in a semicircular path and along a lower run defined by the lower chords 37 to a roller 39 at the one end 32 and around the roller 39 in a semicircular path to return to travel along the upper run. The belt 33 is driven along the endless path by suitable drive means, such as a motor 40, which is operatively connected with the roller 38 at the other end 34 of the horizontal conveyor 3.

In the illustrated structure, the belt 33 is also formed of a plurality of elongate sections 41 each having a leading end 42 mounted on one of a plurality of longitudinally spaced belt support members 43 and a free or trailing end 44 in an overlying relation with a leading end 42 of a trailing belt section 41 with the belt support members 43 also supporting the leading end 42 of the trailing belt section 41. The elongate belt support members 43 each extend transversely between a pair of laterally spaced endless power transmitting members in form of chains 45. The rollers 38 and 39 each have a pair of sprockets 46 each having a plurality of circumferentially spaced teeth engaging within links of the chains 45 to move same in the endless path along the horizontal conveyor 3.

Suitable poultry retaining means, such as a housing 47 is mounted on the horizontal conveyor 3 and positioned above the belt 33. The housing 47 has a pair of laterally spaced sidewalls 48 and 49 spaced adjacent opposite edges of the belt sections 41. An upper or top wall 50 extends between opposite upper edges of the sidewalls 48 and 49 with the top wall 50 being spaced above the belt 33 and substantially parallel with the horizontal conveyor 3 at a distant above the belt 33 sufficient to permit the poultry to move therebetween.

The truck or trailer 5 having the cages 4 thereon is positioned adjacent one side of the horizontal conveyor 3 and the sidewall adjacent the truck or trailer 5, as for example sidewall 48 is tilted upwardly to provide access by operators or loaders (not shown) to manually grasp the poultry and move same into the respective cages 4. The operators or loaders (not shown) stand on one of a pair of platforms 51 to the side of and below the horizontal conveyor 3. Opposite ends of each of the sidewalls 48 and 49 are supported in an open position by support members 52 having one end pivotally mounted on an outer edge of the respective sidewall and the other end suitably supported on the respective platform 51 as by being received within a sleeve 53 mounted on an upper surface of the respective platform 51.

The platform 51 are positioned adjacent opposite edges of the horizontal conveyor 3 and are spaced therebelow a distance sufficient to permit the operators or loaders (not shown) on the respective platform 51 to manually grasp poultry and remove same from the horizontal conveyor 3 and place same in the cages 4 on the truck or trailer 5 while in a standing position.

The belts 14 and 33 on the inclined conveyor 2 and the horizontal conveyor 3 respectively are driven at such a speed that operators or loaders (not shown) standing on one of the platforms 51 adjacent the transporting vehicle being loaded are able to grasp the poultry and place same in the cages 4 without congestion occurring on the horizontal conveyor 3. However, if congestion does occur on the horizontal conveyor 3, it is necessary to stop same until the operators or loaders (not shown) can catch up and then to again start the belt on the horizontal conveyor 3 as loading operations continue.

In the illustrated structure, a hingedly mounted end wall 54 is positioned at the other end 34 of the horizontal conveyor 3 opposite the inclined conveyor 2 and is operative to stop the motor 40 when the poultry on the horizontal conveyor 3 moves into contact with the end wall 54 and moves same to a circuit interrupting position. A safety switch 55 is mounted adjacent the end wall 54 and is of the limit switch type whereby when poultry moves the end wall 54 outwardly from a selected position, the safety switch 54 interrupts current to the motor 40 thereby stopping the travel of the belt 33 until sufficient poultry can be removed therefrom to remove the pressure of poultry against the end wall or control member 54.

During relatively continuous operation, poultry deposits may build up on the belts 14 and 33. Therefore, a plurality of longitudinally spaced belt scrapers 56 are mounted on the inclined conveyor 2 and the horizontal conveyor 3 to remove the poultry deposits by engaging the respective belt sections during travel along the inclined and horizontal conveyors.

It is preferable to arrange the cages 4 in a row on each side of the truck or trailer 5 and to arrange a plurality of rows stacked vertically on each side of the truck or trailer 5. The horizontal conveyor 3 is, therefore, adapted to be adjusted in elevation or raised and lowered to correspond to the elevation of the rows of cages 4 being loaded. Therefore, suitable elevating means, such as the scissor linkages 6, are mounted on the mobile frame 7 and are operative to raise and lower the horizontal conveyor 3 and the platforms 51.

The scissor linkages 6 each have upper and lower links 57 pivotally connected together. The upper links each have an upper end 58 pivotally connected to the horizontal conveyor 3, as by a pin 59. Each of the lower links 57 have a lower end 60 connected to the mobile frame 7 for pivotal movement relative thereto. In the illustrated structure, the connection of the lower ends of the lower links 57 to the mobile frame 7 includes a pair of laterally spaced elongate shafts 61, each having the lower ends 60 of the lower links 57 mounted thereon. The pair of shafts 61 each have opposite ends 62 rotatably mounted on the mobile frame 7. Interengaging gears 63 are mounted on the shafts 61 intermediate the opposite ends 62 therefore whereby the scissor linkages 6 move as a unit to raise and lower the horizontal conveyor 3 and platform 51 to position same at a selected unloading height.

In the illustrated structure, the elevating means includes a pair of sets of scissor linkages 6 with each set having laterally spaced linkages mounted adjacent opposite edges of the mobile frame 7.

Suitable power means, such as a motor 64, is mounted on the horizontal conveyor 3 and is operatively connected to the sets of scissor linkages 6 for raising and lowering the horizontal conveyor 3 to a selected unloading elevation corresponding to the level of the cages 4 being loaded. The motor 64 is operatively connected to a drum 65 for winding and unwinding cable 66. The drum has the cable 66 operatively connected with a pair of pulleys 67 and 68 each mounted on a support member 69 extending between the pivotal connection of an upper and lower link 57 of the opposed scissor linkages 6 at each edge of the mobile frame 7, as best illustrated in FIGS. 1 and 13.

Stabilizer structure is provided for the frame and conveyor structure to assure that each part remains in selected elevated or inclined position without danger of collapsing or change of position until moved by the power mechanism.

With this type of scissor linkages 6 and the means illustrated for extending and retracting same, it is possible for one of the sets of the opposed scissor linkages 6 to extend upwardly or downwardly farther than the other of the sets of scissor linkages 6 thereby positioning the horizontal conveyor 3 and the platform 51 in an inclined or unlevel position. Therefore, connecting members 70 extend between one end of the mobile frame 7 and the inclined conveyor 2. In the illustrated structure, a pair of laterally spaced connecting members 70 each have opposite ends pivotally connected to the one end of the mobile frame 7 and to opposite sides of the inclined conveyor 2 intermediate the ends thereof.

In use, the lower end 8 of the inclined conveyor 2 engages the ground surface 9 and as the horizontal conveyor 3 is raised or lowered, the mobile frame 7 moves toward or away from the lower end 8 of the inclined conveyor 2 and the connecting or brace members 70 act upon and move with the inclined conveyor 2 and the mobile frame 7 to cooperate therewith and with the adjacent set of scissor linkages 6 to form a triangular support for the poultry loading apparatus thus providing an automatic length adjustment of the conveyors to keep the loading end at the cages as the vertical position of the conveyors change.

It is to be understood that while we have illustrated and described one form of our invention, it is not to be limited to the specific form or arrangement of parts herein described and shown, except insofar as such limitations are included in the claims.

What we claim and desire to secure by Letters Patent is:

1. A poultry loading apparatus comprising:
   a. a mobile frame;
   b. an elongate inclined poultry receiving and moving conveyor having a frame and having a belt movable longitudinally therealong, said inclined conveyor being supported on said mobile frame;
   c. an elongate horizontal loading conveyor having a frame and having an upper end of said inclined conveyor frame pivotally mounted relative to one end thereof and having a belt movable longitudinally therealong, said horizontal conveyor frame being supported on said mobile frame;
   d. housing means enclosed said belt on said inclined conveyor and at least partially enclosing said belt on said horizontal conveyor;
   e. said housing means including a pair of laterally spaced sidewalls adjacent said belt on said inclined conveyor and a top wall extending between said sidewalls, said top wall being spaced above said belt on said inclined conveyor to provide a passageway for movement of poultry on said conveyor belt;
   f. a platform adjacent said horizontal conveyor, said platform being spaced below said horizontal conveyor;
   g. drive means for moving said belt on said inclined conveyor and said belt on said horizontal conveyor;
   h. elevating means for positioning said horizontal conveyor and platform at a selected elevation, said elevating means being supported by said mobile frame;
   i. said elevating means including at least two opposed scissor linkages longitudinally spaced on said mobile frame;
   j. said opposed scissor linkages each having an upper link and a lower link pivotally connected together, said upper links each having an upper end pivotally connected to said horizontal conveyor frame, said lower links each having a lower end pivotally supported on said mobile frame;
   k. power means operatively connected to said scissor linkages for raising and lowering said horizontal conveyor frame and platform;
   l. means on the inclined conveyor frame adjacent an end thereof remote from the horizontal conveyor frame and providing means anchor said end relative to the ground;
   m. a pair of laterally spaced elongate bracing members each having one end pivotally mounted on said mobile frame and the other end pivotally mounted on said inclined conveyor frame intermediate ends thereof constituting a means for moving the mobile frame and its conveyor frame relative to the anchored end of said inclined conveyor frame and stabilizing said frames as the horizontal conveyor frame is raised and lowered.

2. The poultry loading apparatus as set forth in claim 1 wherein said pivotal support of said lower ends of said lower links on said mobile frame includes:
   a. a pair of laterally spaced elongate shafts each having said lower ends of said lower links of respective scissor linkages mounted thereon, said pair of shafts each having opposite ends rotatably mounted on said mobile frame; and
   b. interengaging gear means mounted on said pair of shafts whereby said opposed scissor linkages move as a unit to raise and lower said horizontal conveyor.

3. A poultry loading apparatus for moving poultry to a position to be manually removed therefrom and placed in cages on a transporting vehicle, said poultry loading apparatus comprising:
   a. an elongate mobile frame;
   b. an elongate conveyor frame above the mobile frame;
   c. elevator means mounted on the mobile frame and connected to the conveyor frame and operative for raising and lowering the conveyor frame and positioning same at selected elevations;
   d. an elongate inclined conveyor frame having one end pivotally connected to an end of the first named conveyor frame with the other end of the inclined conveyor frame located adjacent a poultry receiving point;
   e. laterally spaced endless chains supported on each conveyor frame and having upper and lower runs;
   f. a plurality of rigid connectors extending transversely of the conveyor chains and connected thereto and spaced longitudinally therealong;
   g. a plurality of flexible belt sections supported by the conveyor chains with each section having a leading end fixed to a respective transverse member and a trailing end portion in substantial overlying relation with the leading end portion of the next trailing belt section with said belt being supported by the plurality of frame connectors between the chains whereby the belt sections support loads and forces for moving same are transmitted by the chains to the respective sections; said transverse rigid connectors being spaced apart a distance defining in said belt sections depressed pocket means for cradling individual poulty;
   h. power means operatively connected to the conveyor chains for moving same longitudinally of the frame whereby poultry is received and moved up the inclined conveyor frame and then along the first named conveyor frame;
   i. a platform adjacent first named conveyor frame and supported thereby at a level below the conveyor belt sections thereon;
   j. housing means mounted on the conveyor frames and cooperating with the belt section to form passageways through which the poultry is moved, said housing means on the first named conveyor frame having portions providing access to poultry on the conveyor belt sections therein.